(12) United States Patent
Yochai (10) Patent No.: US 9,858,300 B2
(45) Date of Patent: *Jan. 2, 2018

(54) HASH BASED DE-DUPLICATION IN A STORAGE SYSTEM

(71) Applicant: Infinidat LTD., Herzliya (IL)

(72) Inventor: Yechiel Yochai, Moshav Aviel (IL)

(73) Assignee: INFINIDAT LTD., Herzliya (IL)

( * ) Notice: Subject to any disclaimer, the term of this patent is extended or adjusted under 35 U.S.C. 154(b) by 188 days.

This patent is subject to a terminal disclaimer.

(21) Appl. No.: 14/312,724

(22) Filed: Jun. 24, 2014

(65) Prior Publication Data

US 2015/0370835 A1    Dec. 24, 2015

(51) Int. Cl.
G06F 17/30    (2006.01)

(52) U.S. Cl.
CPC .... G06F 17/30303 (2013.01); G06F 17/3033 (2013.01)

(58) Field of Classification Search
CPC ........... G06F 17/3033; G06F 17/30333; G06F 17/30336
See application file for complete search history.

(56) References Cited

U.S. PATENT DOCUMENTS

| | | | |
|---|---|---|---|
| 7,890,480 B2* | 2/2011 | Barsness ............. | G06F 17/3033 707/702 |
| 2012/0166448 A1* | 6/2012 | Li ..................... | G06F 17/30097 707/747 |
| 2012/0226699 A1* | 9/2012 | Lillibridge ........ | G06F 17/30371 707/747 |
| 2014/0143213 A1* | 5/2014 | Tal .................... | G06F 17/30156 707/692 |

(Continued)

OTHER PUBLICATIONS

Shalev et al., "Split-ordered lists: Lock-free extensible hash tables", Journal of the ACM, vol. 53 Issue 3, pp. 379-405, May 2006, ACM.*

*Primary Examiner* — Leslie Wong (74) *Attorney, Agent, or Firm* — Reches Patents (57) ABSTRACT

A method for de-duplication, the method may include receiving a request to store in a storage system a received data entity; obtaining a received data entity signature that is responsive to the received data entity; selecting a selected data structure out of a set of data structures that comprises K data structures; wherein K is a positive integer; wherein for each value of a variable k that ranges between 2 and K, a stored data entity signature that is stored in a k'th data structure out of the set collided with stored data entity signatures that are stored in each one of a first till (k−1)'th data structures of the set; calculating an index by applying, on the received data entity signature, a hash function that is associated with the selected data structure; determining whether an entry that is associated with the index and belongs to the selected data structure is empty; writing to the entry, if the entry is empty, the received data entity signature, and storing the received data entity in the storage system in response to a location of the entry in the set; selecting, if (a) the entry is not empty and (b) the received data entity signature differs from a stored data entity signature that is stored in the entry, a new data structure of the set, and repeating at least the stages of calculating and determining.

21 Claims, 5 Drawing Sheets

(56) References Cited

U.S. PATENT DOCUMENTS

2015/0095346 A1* 4/2015 Kimmel .............. G06F 17/3033
 707/747
2015/0205680 A1* 7/2015 Kimmel .............. G06F 12/0246
 707/649
2015/0205727 A1* 7/2015 Kimmel ................ G06F 3/0611
 711/103

* cited by examiner

HASH BASED DE-DUPLICATION IN A STORAGE SYSTEM

BACKGROUND

Storage systems are expected to store growing amounts of data. This can be achieved by adding storage system resources and, additionally or alternatively, by using the storage system resources in an efficient manner.

There is a growing need to provide means for better utilization of storage system resources.

SUMMARY

According to an embodiment of the invention various methods may be provided and are described in the specification. According to various embodiments of the invention there may be provided a non-transitory computer readable medium that may store instructions for performing any of the methods described in the specification and steps thereof, including any combinations of same. Additional embodiments of the invention include a mass storage arranged to execute any or all of the methods described in the specification above, including any stages- and any combinations of same.

According to an embodiment of the invention there may be provided a storage system that may include a processor that may be arranged to receive a request to store, in the storage system, a received data entity; obtain a received data entity signature that is responsive to the received data entity; select a selected data structure out of a set of data structures; calculate an index by applying, on the received data entity signature, a hash function that is associated with the selected data structure; determine whether an entry that is associated with the index and belongs to the selected data structure is empty; write to the entry, if the entry is empty, the received data entity signature, and assist in storing the received data entity in a permanent layer of the storage system in response to a location of the entry in the set; select, if (a) the entry is not empty and (b) the received data entity signature differs from a stored data entity signature that is stored in the entry, a new data structure of the set, and repeating at least the stages of calculating and determining; and a memory for storing the set of data structures; wherein the set of data structures may include K data structures; wherein K is a positive integer; wherein for each value of a variable k that ranges between and K, a stored data entity signature that is stored in a k'th data structure out of the set collided with stored data entity signatures that are stored in each one of a first till (k−1)'th data structures of the set The processor may be arranged to prevent a storing of the data entity in the storage system if (a) the entry is not empty and (b) the received data entity signature equals the stored data entity signature that is stored in the entry.

The K repetition of the selecting of the selected data structure results in scanning the set, starting from a first data structure.

The processor may be arranged to associate a target address with the data entity; and wherein each entry of the set does not store the target address.

Each entry of the set only stores a stored data entity signature of a received data entity that is associated with the entry.

The permanent layer may be arranged to store the received data entity at a physical address that corresponds to the location of the entry in the set of data structures.

The processor may be arranged to store the received data entity at a virtual address that corresponds to the location of the entry in the set of data structures.

The processor is arranged to receive a request to read a requested data entity that has a requested data entity signature; selecting a selected data structure out of the set; calculate an index by applying, on the requested data entity signature, a hash function that is associated with the selected data structure; determine whether there is a match between (a) a stored data entity signature that is stored in an entry that is associated with the index and belongs to the selected data structure and (b) the requested data entity signature; provide, if there is a match, a data entity that is associated with the entry; select, if there is no match, a new data structure of the set and repeating at least the stages of calculating and determining.

According to an embodiment of the invention there may be provided a method that may include receiving a request to store in a storage system a received data entity; obtaining a received data entity signature that is responsive to the received data entity; selecting a selected data structure out of a set of data structures that may include K data structures; wherein K is a positive integer; wherein for each value of a variable k that ranges between and K, a stored data entity signature that is stored in a k'th data structure out of the set collided with stored data entity signatures that are stored in each one of a first till (k−1)'th data structures of the set; calculating an index by applying, on the received data entity signature, a hash function that is associated with the selected data structure; determining whether an entry that is associated with the index and belongs to the selected data structure is empty; writing to the entry, if the entry is empty, the received data entity signature, and storing the received data entity in the storage system in response to a location of the entry in the set; selecting, if (a) the entry is not empty and (b) the received data entity signature differs from a stored data entity signature that is stored in the entry, a new data structure of the set, and repeating at least the stages of calculating and determining.

The method may include preventing from storing the data entity in the storage system if (a) the entry is not empty and (b) the received data entity signature equals the stored data entity signature that is stored in the entry.

The K repetition of the selecting of the selected data structure results in scanning the set, starting from a first data structure.

The storing of the data entity may include associating a target address with the data entity; and wherein each entry of the set does not store the target address.

The each entry of the set only stores a stored data entity signature of a received data entity that is associated with the entry.

The method may include storing the received data entity at a physical address that corresponds to the location of the entry in the set of data structures.

The method may include storing the received data entity at a virtual address that corresponds to the location of the entry in the set of data structures.

The method may include receiving a request to read a requested data entity that has a requested data entity signature; selecting a selected data structure out of the set; calculating an index by applying, on the requested data entity signature, a hash function that is associated with the selected data structure; determining whether there is a match between (a) a stored data entity signature that is stored in an entry that is associated with the index and belongs to the selected data structure and (b) the requested data entity signature; providing, if there is a match, a data entity that is associated with the entry; selecting, if there is no match, a new data structure of the set and repeating at least the stages of calculating and determining.

According to an embodiment of the invention there may be provided a non-transitory computer readable medium that stores instructions that once executed by a computer cause the computer to perform the stages of receiving a request to store in a storage system a received data entity; applying a certain hash function on the received data entity to provide a data entity signature; selecting a selected data structure out of a set of data structures that may include K data structures; wherein K is a positive integer; wherein for each value of a variable k that ranges between and K, a stored data entity signature that is stored in a k'th data structure out of the set collided with stored data entity signatures that are stored in each one of a first till (k−1)'th data structures of the set; calculating an index by applying, on the received data entity, a hash function that is associated with the selected data structure; determining whether an entry that is associated with the index and belongs to the selected data structure is empty; writing to the entry, if the entry is empty, the received data entity signature, and storing the received data entity in the storage system in response to a location of the entry in the set; selecting, if (a) the entry is not empty and (b) the received data entity signature differs from a stored data entity signature that is stored in the entry, a new data structure of the set, and repeating at least the stages of calculating and determining.

The non-transitory computer readable medium that stores instructions for preventing from storing the data entity in the storage system if (a) the entry is not empty and (b) the received data entity signature equals the stored data entity signature that is stored in the entry.

The non-transitory computer readable medium wherein K repetition of the selecting of the selected data structure results in scanning the set, starting from a first data structure.

The non-transitory computer readable medium that stores instructions for storing of the data entity may include by associating a target address with the data entity; and wherein each entry of the set does not store the target address.

The non-transitory computer readable medium wherein each entry of the set only stores a stored data entity signature of a received data entity that is associated with the entry.

The non-transitory computer readable medium that stores instructions for storing the received data entity at a physical address that corresponds to the location of the entry in the set of data structures.

The non-transitory computer readable medium that stores instructions for storing the received data entity at a virtual address that corresponds to the location of the entry in the set of data structures.

The non-transitory computer readable medium that stores instructions for receiving a request to read a requested data entity that has a requested data entity signature; selecting a selected data structure out of the set; calculating an index by applying, on the requested data entity signature, a hash function that is associated with the selected data structure; determining whether there is a match between (a) a stored data entity signature that is stored in an entry that is associated with the index and belongs to the selected data structure and (b) the requested data entity signature; providing, if there is a match, a data entity that is associated with the entry; selecting, if there is no match, a new data structure of the set and repeating at least the stages of calculating and determining.

BRIEF DESCRIPTION OF THE DRAWINGS

The subject matter regarded as the invention is particularly pointed out and distinctly claimed in the concluding portion of the specification. The invention, however, both as to organization and method of operation, together with data entities, features, and advantages thereof, may best be understood by reference to the following detailed description when read with the accompanying drawings in which:

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with data entities, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

There are provided, systems, methods and non-transitory computer readable media for hash based de-duplication. The hash-based de-duplication both reduced the amount of content that is stored in the storage system and utilizes a concise management data structure.

According to an embodiment of the invention a set of hash tables is used for de-duplication as well as for address translation. The set of hash tables is used for translating each unique data signature (that serves as a key for looking up the hash table) into an address that stores content shared by all data entities having the same data signature, and therefore, the same content. The signatures represent the data entities and are used to identify duplicate data entities. The signatures are created by applying a hash algorithm on the data entity, such as Secure Hash Algorithm 1 (SHA-1), Message Digest Algorithm 5 (MD5) or any other algorithm known in the art for producing data signatures for deduplication. In the following description, it is assumed that the data entities are of fixed size.

According to yet another embodiment of the invention the entries of the hash tables may store only (or almost only) data entity signatures and does not include the addresses where the data of the data entity(s), with the corresponding signatures, is stored. This reduces the size of the hash tables.

According to an embodiment of the invention a hash function (different from the hash function that produced the signature) is applied on a key that is a data entity signature to provide an index that points to an entry of a hash table of a set of hash tables.

Only a single key may be stored in each entry of each hash table of the set. According to an embodiment of the invention each entry of each hash table may store only the key and does not store the value to be retrieved, i.e. the address.

Furthermore—according to an embodiment of the invention the hash tables of the set do not explicitly store information related to collisions (such as a pointer to a linked list of collided keys). When writing a new data entity—in case of a collision—a new entry is searched for that new data entity.

There is provided a set of hash tables that include a primary table that is relatively small, as the number of entries of the primary table is equal to the number of keys to be supported. The total number of entries in all tables is about twice the number of keys to be supported.

Figure 1:
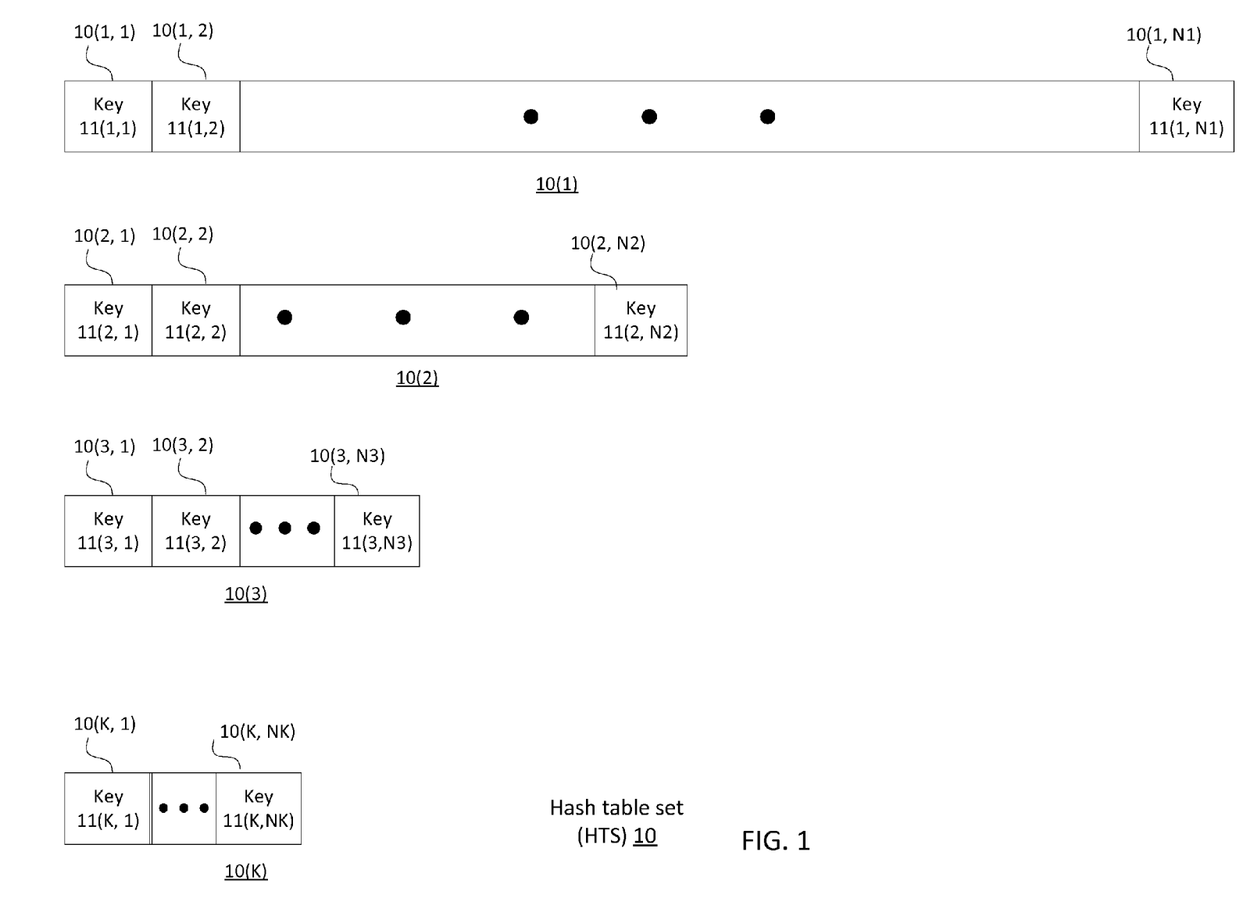
FIG. 1 illustrates a set of hash tables according to an embodiment of the invention.

The set of hash tables may include multiple (K) hash tables, such as hash tables $10(1)$, $10(2)$, $10(3)$ and $10(K)$ of FIG. 1, wherein each hash table k ($1<=k<=K$) stores keys that collide with keys (data entity signatures) in hash table (k−1) and with keys in any former table. For example, table $10(2)$ includes keys that collide with keys in table $10(1)$ and table $10(3)$ includes keys that collide with keys in tables $10(2)$ and table $10(1)$.

A first hash table, e.g. table $10(1)$, is associated with a first hash function for calculating an index in the first hash table. First hash table $10(1)$ includes N1 entries, such as entries $10(1,1)$, $10(1,2)$ and $10(1,N1)$, wherein N1 may be the number of elements (i.e., elements with different keys) required to be supported by the hash mechanism. The entries of the table, collectively denoted as 10, includes first keys and does not include associated values (e.g., the addresses that store data entities with the corresponding first keys), for example, entry $10(1,1)$ includes a first key $11(1,1)$, entry $10(1,2)$ includes a first key $11(1,2)$, and entry $10(1,N1)$ includes a first key $11(1,N1)$. No other value is needed to be stored in the entries, as the value may be calculated by a formula involving the index (e.g., index n1) within the table, for example: n1*5. The first keys are keys that did not collide with any existing key when the first keys were added to the hash mechanism.

A second hash table, e.g. table $10(2)$, is used for storing second keys that form collisions with the first keys (duplicate indices) when trying to apply the first hash function on the second keys. That is to say, the first hash function produces an entry-index and the corresponding entry in the first hash table is already occupied by another key. A second hash function is used for producing indices for the second hash table and may be a different hash function from the first hash function.

The second hash table includes N2 entries that respectively includes N2 second keys, for example, entries $10(2,1)$, $10(2,2)$ and $10(2,N2)$ respectively includes second keys $11(2,1)$, $11(2,2)$ and $11(2,N2)$. N2 may be the number of keys expected to be collided with some of the first keys, when trying to apply the first hash function on the second keys.

When the number of entries in the hash table is equal to the number of keys, the chance for collision is $1/e$ ($e=2.7$), and therefore N2 is equal to $N/e$, or between $N1/3$ to $N1/2$. For the sake of simplicity, in the following examples, it is assumed that $N2=N1/2$, as can be shown from FIG. 1 where hash table $10(1)$ is twice as long as table $10(2)$ and table $10(2)$ is twice as long as table $10(3)$.

A third hash table, e.g. table $10(3)$, is used for storing third keys that form collisions with first keys when trying to apply the first hash function on the third keys, and also form collisions with second keys when trying to apply the second hash function on the third keys. There are N3 entries in hash table $10(3)$, wherein N3 may be the number of keys expected to be collided with some of the second keys.

A k'th hash table is used for storing keys that forms collisions when applying any of the previous k−1 hash functions. A k'th hash function is used for producing indices for the k'th hash table and is preferably different from any of the other hash functions used for the other hash tables. The k'th hash table includes Nk entries, which equals, for example $N[k-1]/2$, or by using another presentation: $N1/(2^{k-1})$.

The last table, $10(K)$, includes all the remaining keys and usually includes only few keys, e.g., 8-16 keys. The few entries in this K'th hash table are searched sequentially without using a formula for accessing a certain index.

The number (K) of hash tables is dictated by the total number of supported keys (N1), e.g., for 1M keys, there are 17-18 hash tables, and for 1G keys there are 27-28 tables. The total number of entries in all tables is about twice the total number of supported keys, i.e. $2*N1$.

The described hash mechanism can be applied in cases where the value associated with the key can be calculated using a formula that involves the entry-index as a variable of the formula, for example, the value associated with index m in table j may be: $C1*m+C2*j$, wherein C1 and C2 are constant values.

Since deduplication algorithms are performed for data entities of a fixed size (S), the index of the entry produced for a data entity signature dictates the location of the data content related to the data signature in the volume. The data content may be applicable to more than one data entities having the same signature. For example, suppose an index that equals n1 ($1<=n1<=N1$) is produced by applying the first hash function on a first signature and there is no collision. It can be determined that the offset (or logical address) of the data content related to the first signature within the volume is (n1−1)*S.

When adding a second signature whose index is also calculated to be n1, while the n1'th entry is occupied by the first signature, the second hash table is used for hosting the second signature, and a second hash function is used to calculate a second index for the second signature. The second index points to an entry in the second hash table. Suppose the second index equals n2, the address in the logical volume for storing the data content related to the second signature is: N1*S+(n2−1)*S.

If the entry n2 in the second hash table is also occupied, then a third hash function will produce an index into a third hash table, and so on.

A data content whose signature is represented by a $n_k$ index in the k'th hash table, is associated with an address in (for example) the logical volume which is the total number of entries in the (k−1) tables multiplied by the fixed size S, plus the number of preceding entries in the k'th table multiplied by S, or as demonstrated by the formula:

$$address = S*(nk-1) + S*\Sigma_{i=1}^{k-1} Ni$$

Figure 2:
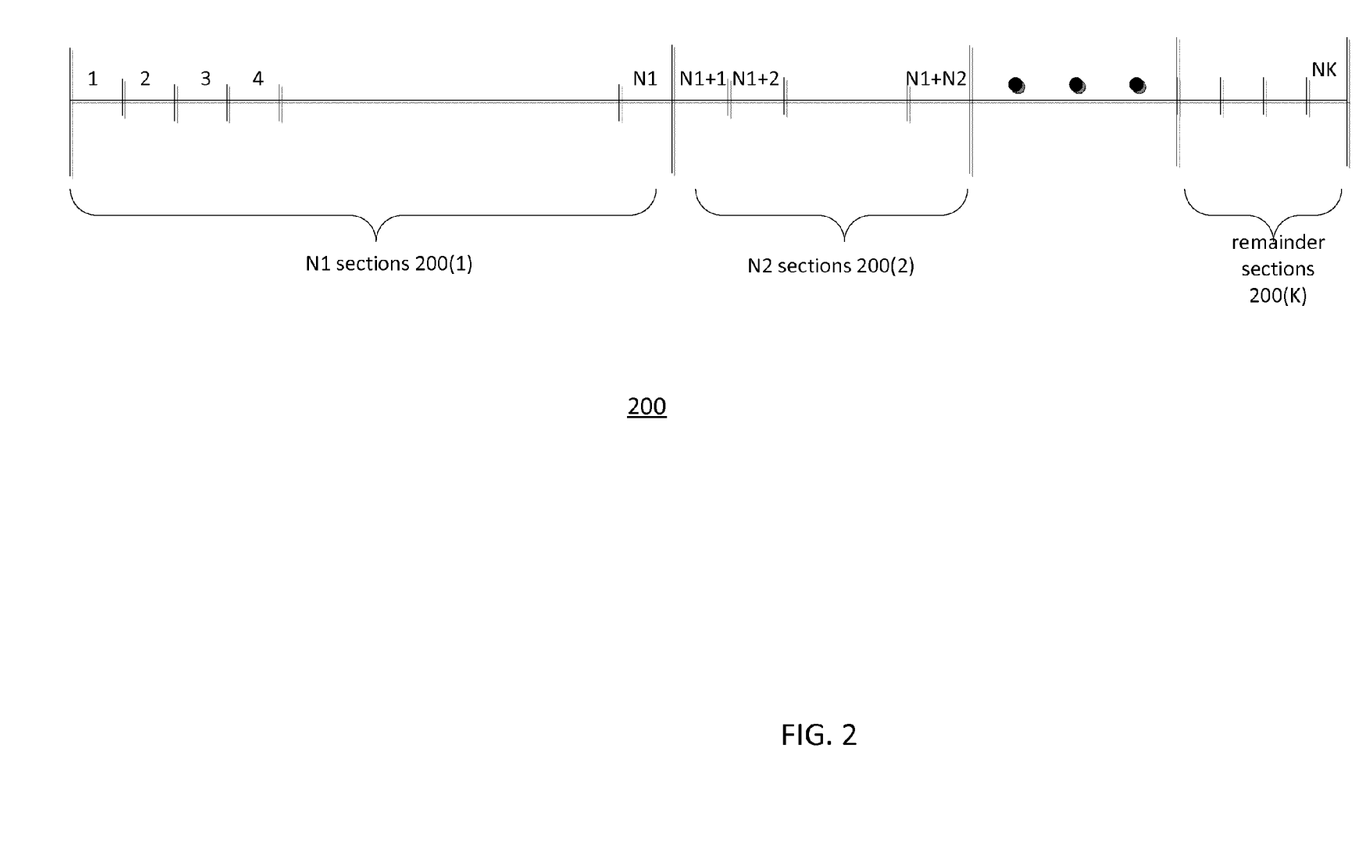
FIG. 2 illustrates a logical volume according to an embodiment of the invention.

FIG. 2 illustrates an address space of the logical volume 200 according to an embodiment of the invention.

The first N1 sections 200(1) of the logical volume 200 are reserved for data of data entities whose keys are handled by the first hash table (10(1) of FIG. 1).

Each first section 200(1) is of a fixed size, S.

The next N2 sections 200(2) of logical volume 200 are reserved for data of data entities whose keys are handled by the second hash table (10(2) in FIG. 1), and so on.

The end of the logical volume 200 includes few sections 200(K) reserved to data of the remainders of the data entities (the K'th hash table 10(K) of FIG. 1), those data entity whose keys collided with other keys when applying any of the hash functions.

There are only few sections, in this example—4, as it is expected to be only few remained data entities.

Any type of data entitys of fixed size and having an identifier, other than the data entities described above, can be handled by a storage system with the aid of the described hash mechanism, for translating the identifier into an address in a storage space. The identifier that forms the key may be, for example, a signature, and the hash mechanism enables translating the signature into an index and then into a virtual address within a virtual address space or into a physical address within a physical resource, e.g. an address in a memory.

Figure 3:
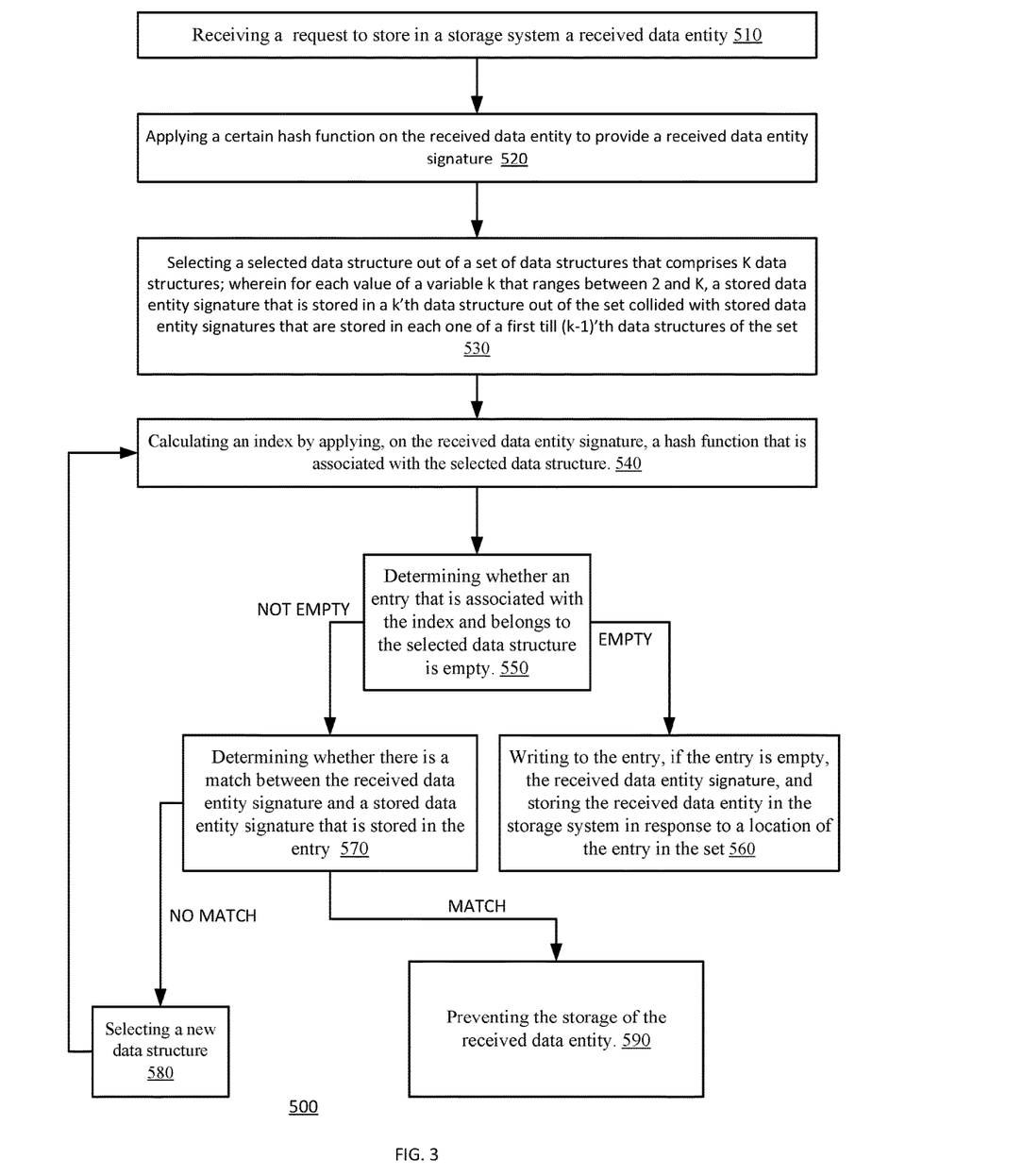
FIG. 3 illustrates a method according to an embodiment of the invention.

FIG. 3 illustrates a method 500 according to an embodiment of the invention.

Method 500 is for performing hash-based writing to a storage system. The writing includes a de-duplication mechanism.

Method 500 may start by stage 510 of receiving a request to store, in a storage system, a received data entity.

Figure 5:
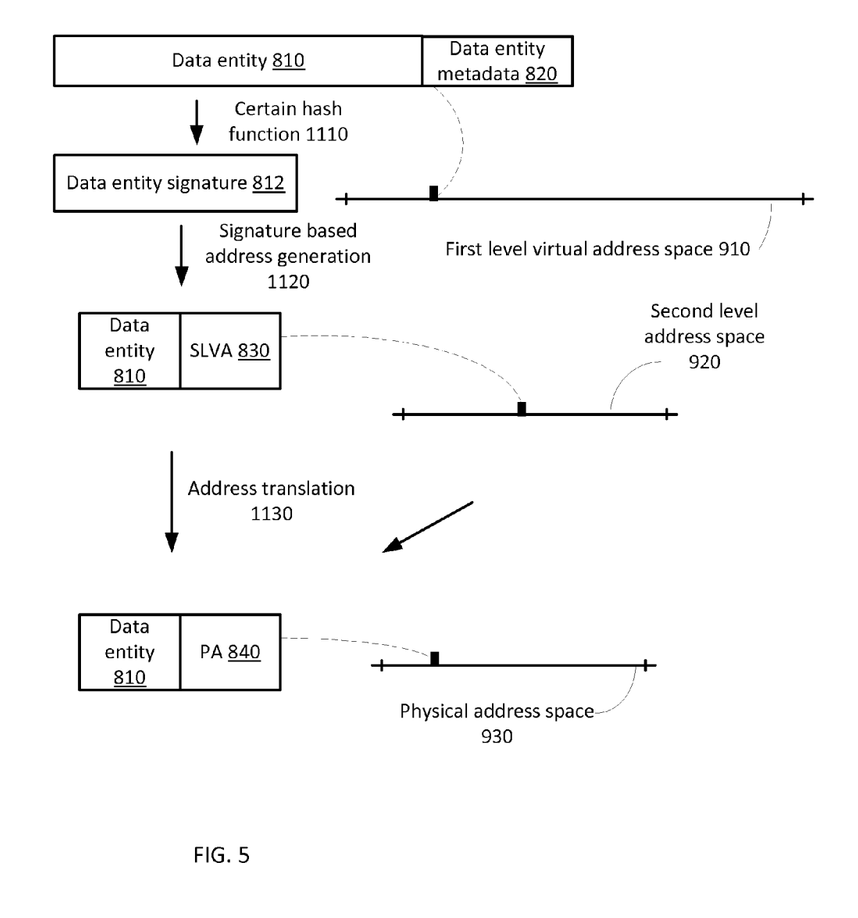
FIG. 5 illustrates a storage system, multiple address spaces and data entities according to an embodiment of the invention.

The received data entity may be associated with received data entity metadata. The received data entity metadata may be, for example, a received data entity identifier, a received data entity virtual address or any type of metadata related to the received data entity. The received data entity itself may include any combination of text, symbols, images, numbers and the like. FIG. 5 illustrates received data entity 810 and its received data entity metadata 820. The received data entity metadata 820 may include a first level virtual address (FLVA) 821 of the received data entity. The received data entity may be associated with a received data entity signature.

Stage 510 may be followed by stage 520 of obtaining the received data entity signature. The obtaining may include obtaining the received data entity signature already associated with the received data entity. For example, a host that is coupled to the storage system may send to the storage system the received data entity along with the received data entity signature, or another module within the storage system may calculate the received data entity signature prior to the execution of method 500. In case the received data entity is not already associated with a received data entity signature, the obtaining includes applying a certain hash function on the received data entity to provide the data entity signature.

Stage 520 may be followed by stage 530 of selecting a selected data structure out of a set of data structures that comprises K data structures; wherein K is a positive integer; wherein for each value of a variable k that ranges between 2 and K, a stored data entity signature that is stored in a k'th data structure out of the set collided with stored data entity signatures that are stored in each one of a first till (k−1)'th data structures of the set.

The set of data structures may include hash tables such as the hash tables 10(1)-10(K) of FIG. 1. These data structures may differ from tables and may be organized in various other manners.

It is noted that each hash table is associated with its own hash function. There may be between 1 and K different hash functions associated with hash tables of the set of K hash tables.

The selection can be made in various manners. For example—the first selecting may include selecting the first hash table and the hash function associated with it. Multiple repetitions of the selection may result in selecting and checking one hash table after the other so that if K repetitions are made, the entire set is checked.

The data structures of the set may be concise in the sense that their entries may be limited to storing only data entity signatures or otherwise do not store the addresses to be retrieved in response to signatures.

Stage 530 may be followed by stage 540 of calculating an index by applying, on the received data entity signature, a hash function that is associated with the selected data structure.

Stage 540 may be followed by stage 550 of determining whether an entry that is associated with the index and belongs to the selected data structure is empty.

If the entry is empty then stage 550 may be followed by stage 560 of writing to the entry the received data entity signature, and storing the received data entity in an address space of the storage system in response to a location of the entry in the set. The address space may be for example, an internal logical volume, utilized for de-duplicated data. The data entity may be stored in a target address. The target address may be a virtual address, a physical address and the like.

If the entry is not empty then stage 550 may be followed by stage 570 of determining whether there is a match between the received data entity signature and a stored data entity signature that is stored in the entry.

If there is a match, which may occur when there is already a stored data entity with the same content so there is no need to store this content, stage 570 may be followed by stage 590 of preventing the storing of the received data entity (preventing storage of duplicates of the content of the data entity).

If there is no match, which may be a case of a regular hash collision, stage 570 may be followed by stage 580 of selecting a new data structure and jumping to stage 540.

Method 500 may be part of a process of receiving a write request from another system coupled to the storage system, e.g., from a host server, a filesystem client, and the like. It is assumed that the write request includes a logical address in a volume exposed to the host, where the data entity is requested to be written. It is also assumed that the storage system manages an address-to-signature table that converts the logical addresses known to the host into signatures of data entities stored in these logical addresses. The signature obtained in stage 520 is written to this address-to-signature table in association with the logical address received from the host. The updating of the address-to-signature table may be included in stage 520, or may be part of a separate module that is responsible to handle received requests, to calculate signatures and then deliver the received data entity along with the calculated signature.

Method 500 may be otherwise part of a background process that scans portions of the storage space of the system, such as the logical volume exposed to the host, and determines whether there is duplicated data among the stored data entities. The deduplication background process reads data entities from the host logical volume and executes method 500 for each data entity. The calculation of the signature and the building of the address-to-signature table may be part of stage 520 of method 500 or may be executed prior to executing method 500. Method 500 handles an internal logical volume that is not exposed to the host for storing the de-duplicated data. The internal logical volume may be a sparse volume that is twice as large as the host logical volume. The writing of stage 560 involves writing to the internal logical volume.

Figure 4:
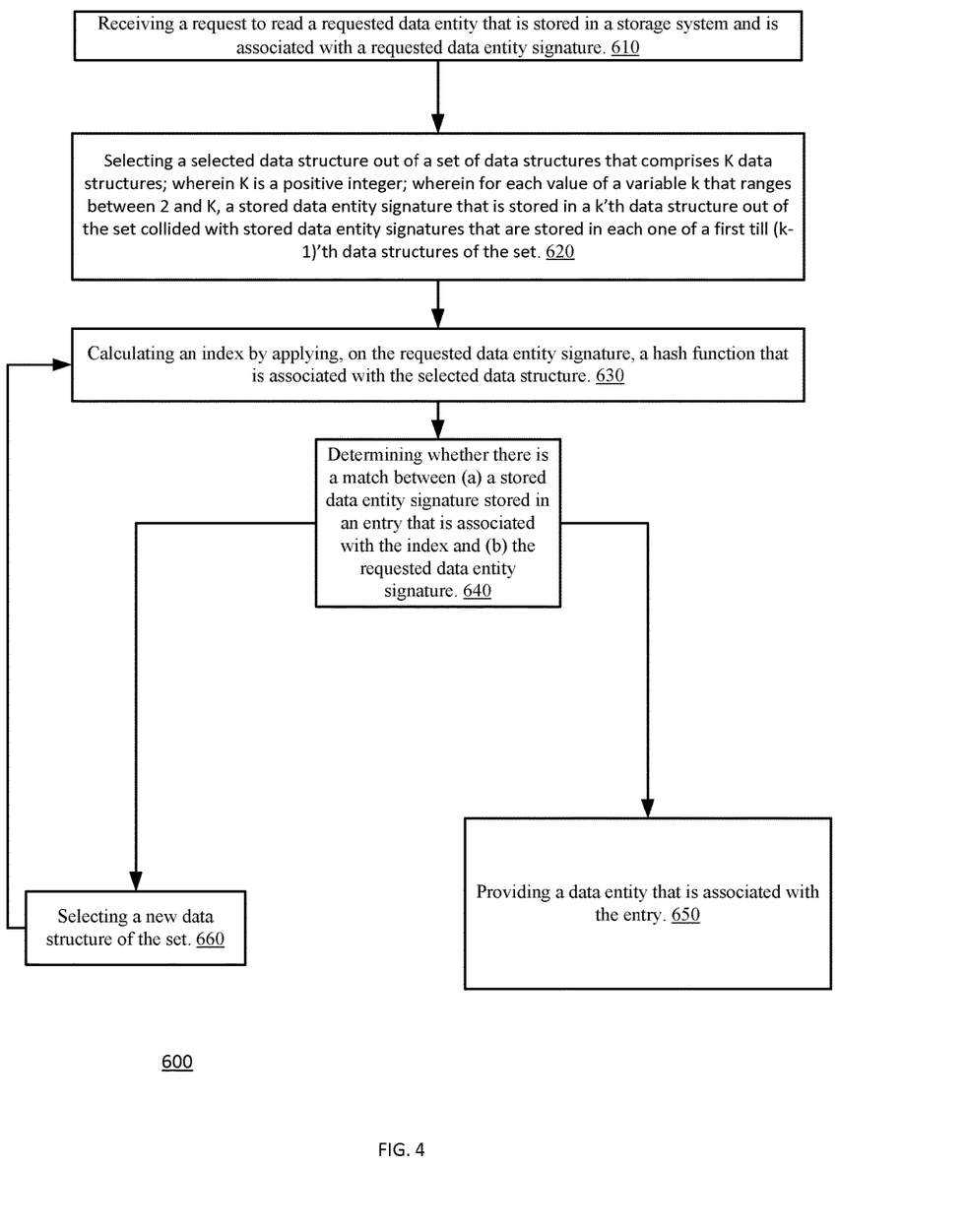
FIG. 4 illustrates a method according to an embodiment of the invention.

FIG. 4 illustrates a method 600 according to an embodiment of the invention.

Method 600 may start by stage 610 of receiving a request to read a requested data entity that is stored in a storage system and is associated with a requested data entity signature. The request may include the requested data entity signature or otherwise, the request may include a logical address of the requested data entity and the requested data entity signature associated with the logical address can be read from the address-to-signature table.

Stage 610 may be followed by stage 620 of selecting a selected data structure out of a set of data structures that comprises K data structures; wherein K is a positive integer; wherein for each value of a variable k that ranges between 2 and K, a stored data entity signature that is stored in a k'th data structure out of the set collided with stored data entity signatures that are stored in each one of a first till (k−1)'th data structures of the set.

Stage 620 may be followed by stage 630 of calculating an index by applying, on the requested data entity signature, a hash function that is associated with the selected data structure.

Stage 630 may be followed by stage 640 of determining whether there is a match between (a) a stored data entity signature stored in an entry that is associated with the index and (b) the requested data entity signature.

Stage 640 may be followed by stage 650 of providing, if there is a match, a data entity that is associated with the entry.

Stage 640 may be followed by stage 660 of selecting, if there is no match, a new data structure of the set and repeating at least the stages of calculating the index and determining whether there is a match. For example, for k between 1 and (K−1) if the k'th data structure does not include a matching data entity metadata then stage 660 includes selecting the (k+1)'th data structure and jumping to stage 630.

It is noted that methods 500 and 600 may perform the repetition of stages in serial, in a partially overlapping manner or in parallel. For example, multiple hash functions may be applied to provide multiple indexes and the entries associated with these indexes may be checked in parallel.

FIG. 5 illustrates a storage system 700, multiple address spaces 910, 920 and 930 and data entity 810 according to an embodiment of the invention.

The storage system 700 is illustrated as including a control and caching layer 710 and a permanent storage layer 740 that includes multiple disk drives. The control and caching layer 710 is coupled to one or more host computers such as host computer 760.

The control and caching layer 710 is illustrated as including a processor 720 and a memory 730 and may interface between the host computer (a first level virtual address space 910 that is exposed to the host computer) and the permanent storage layer 740 (and its physical address space 930). The memory 730 may store hash table set (HTS) 10. The HTS 10 may be stored in other locations of the storage system.

FIG. 5 illustrates a process that includes applying a certain hash function (a hash function used for creating a received data entity signature) on received data entity 810 to provide a received data entity signature 812. It is noted that FIG. 5 illustrates an example in which the data entity metadata 820 (which may include a first level virtual address of first virtual address space) is not used during the de-duplication and address translation.

A signature based address generation process 1120 may be applied if there is no duplication and the process 1120 may determine a physical address (PA 840) of the received data entity. Alternatively, the signature based address generation process may determine (if there is no duplication) a second level virtual address (in response to the location of the entry in the set) SLVA 830 and a further address translation (1130) is required for determining the physical address of the received data entity.

It is further noted that a storage system may perform one, three or more different address translations. For example, there may be more than two levels of virtual address spaces, a single level of virtual address spaces, more than a single level of physical address spaces and the like.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an executable application, an applet, a servlet, a source code, a code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, state bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for de-duplication, the method comprises:
   receiving a request to store in a storage system a received data entity;
   obtaining a received data entity signature that is responsive to the received data entity;
   selecting a selected data structure out of a set of data structures that comprises multiple (K) data structures; wherein for each value of a variable k that ranges between 1 and K, each k'th data structure of the set is associated with a k'th hash function for producing indices for the k'th data structure; wherein for each value of the variable k that ranges between 2 and K, the k'th data structure includes stored data entity signatures that collided with stored data entity signatures that are stored in each one of a first till (k−1)'th data structures of the set when applying any of a first to (k−1)'th hash functions; wherein each data structure of the set comprises multiple entries for storing multiple data entity signatures, and wherein different data structures comprise different number of entries;
   calculating an index by applying, on the received data entity signature, a hash function that is associated with the selected data structure; wherein the hash function is different from a hash function that produced the received data entity signature;
   determining whether an entry that is associated with the index and belongs to the selected data structure is empty;
   if the entry is empty: writing the received data entity signature to the entry; calculating a target address within an address space of the storage system, based at least on a location of the entry in the set, wherein the location of the entry in the set comprises the index and a value of the variable k that represents the selected data structure; and storing the received data entity at the target address; wherein each entry of the set does not store the target address, thereby reducing the size of the set; and
   selecting, if (a) the entry is not empty and (b) the received data entity signature differs from a stored data entity signature that is stored in the entry, a new data structure of the set, and repeating at least the stages of calculating and determining.

2. The method according to claim 1 comprising preventing from storing the data entity in the storage system if (a) the entry is not empty and (b) the received data entity signature equals the stored data entity signature that is stored in the entry.

3. The method according to claim 1 wherein K repetition of the selecting of the selected data structure results in scanning the set, starting from a first data structure.

4. The method according to claim 1 wherein each entry of the set only stores a stored data entity signature of a received data entity that is associated with the entry.

5. The method according to claim 1 wherein the target address is a physical address and wherein the method comprising storing the received data entity at the physical address.

6. The method according to claim 1 wherein the target address is a virtual address and wherein the method comprising storing the received data entity at the virtual address.

7. The method according to claim 1 further comprising receiving a request to read a requested data entity that has a requested data entity signature;
   selecting a selected data structure out of the set;
   calculating an index by applying, on the requested data entity signature, a hash function that is associated with the selected data structure;
   determining whether there is a match between (a) a stored data entity signature that is stored in an entry that is associated with the index and belongs to the selected data structure and (b) the requested data entity signature;
   providing, if there is a match, a data entity that is associated with the entry;
   selecting, if there is no match, a new data structure of the set and repeating at least the stages of calculating and determining.

8. A non-transitory computer readable medium that stores instructions that once executed by a computer causes the computer to perform the stages of:
   receiving a request to store in a storage system a received data entity;
   applying a certain hash function on the received data entity to provide a data entity signature;
   selecting a selected data structure out of a set of data structures that comprises multiple (K) data structures; wherein for each value of a variable k that ranges between 1 and K, each k'th data structure of the set is associated with a k'th hash function for producing indices for the k'th data structure; wherein for each value of the variable k that ranges between 2 and K, the k'th data structure includes stored data entity signatures that collided with stored data entity signatures that are stored in each one of a first till (k−1)'th data structures of the set when applying any of a first to (k−1)'th hash functions; wherein each data structure of the set comprises multiple entries for storing multiple data entity signatures, and wherein different data structures comprise different number of entries;

calculating an index by applying, on the data entity signature, a hash function that is associated with the selected data structure; wherein the hash function is different from a hash function that produced the received data entity signature;

determining whether an entry that is associated with the index and belongs to the selected data structure is empty;

if the entry is empty: writing the received data entity signature to the entry; calculating a target address within an address space of the storage system, based at least on a location of the entry in the set, wherein the location of the entry in the set comprises the index and a value of the variable k that represents the selected data structure; and storing the received data entity in the storage system at the target address; wherein each entry of the set does not store the target address, thereby reducing the size of the set; and selecting, if (a) the entry is not empty and (b) the received data entity signature differs from a stored data entity signature that is stored in the entry, a new data structure of the set, and repeating at least the stages of calculating and determining.

9. The non-transitory computer readable medium according to claim 8 that stores instructions for preventing from storing the data entity in the storage system if (a) the entry is not empty and (b) the received data entity signature equals the stored data entity signature that is stored in the entry.

10. The non-transitory computer readable medium according to claim 8 wherein K repetition of the selecting of the selected data structure results in scanning the set, starting from a first data structure.

11. The non-transitory computer readable medium according to claim 8 wherein each entry of the set only stores a stored data entity signature of a received data entity that is associated with the entry.

12. The non-transitory computer readable medium according to claim 8 that stores instructions for storing the received data entity at a physical address, wherein the target address is the physical address.

13. The non-transitory computer readable medium according to claim 8 that stores instructions for storing the received data entity at a virtual address, wherein the target address is the virtual address.

14. The non-transitory computer readable medium according to claim 8 that stores instructions for receiving a request to read a requested data entity that has a requested data entity signature;

selecting a selected data structure out of the set;

calculating an index by applying, on the requested data entity signature, a hash function that is associated with the selected data structure;

determining whether there is a match between (a) a stored data entity signature that is stored in an entry that is associated with the index and belongs to the selected data structure and (b) the requested data entity signature;

providing, if there is a match, a data entity that is associated with the entry;

selecting, if there is no match, a new data structure of the set and repeating at least the stages of calculating and determining.

15. A storage system, comprising:

a processor that is arranged to receive a request to store, in the storage system, a received data entity; obtain a received data entity signature that is responsive to the received data entity;
select a selected data structure out of a set of data structures; calculate an index by applying, on the received data entity signature, a hash function that is associated with the selected data structure, wherein the hash function is different from a hash function that produced the received data entity signature; determine whether an entry that is associated with the index and belongs to the selected data structure is empty; if the entry is empty: write, the received data entity signature to the entry, calculate a target address within an address space of the storage system, based at least on a location of the entry in the set, and assist in storing the received data entity at the target address; select, if (a) the entry is not empty and (b) the received data entity signature differs from a stored data entity signature that is stored in the entry, a new data structure of the set, and repeating at least the stages of calculating and determining; and a memory for storing the set of data structures; wherein the set of data structures comprises multiple (K) data structures; wherein for each value of a variable k that ranges between 1 and K, each k'th data structure of the set is associated with a k'th hash function for producing indices for the k'th data structure; wherein for each value of the variable k that ranges between 2 and K, the k'th data structure includes stored data entity signatures that collided with stored data entity signatures that are stored in each one of a first till (k−1)'th data structures of the set when applying any of a first to (k−1)'th hash functions; wherein each data structure of the set comprises multiple entries for storing multiple data entity signatures, and wherein different data structures comprise different number of entries; wherein each entry of the set does not store the target address, thereby reducing the size of the set;

wherein the location of the entry in the set comprises the index and a value of the variable k that represents the selected data structure.

16. The storage system according to claim 15 wherein the processor is arranged to prevent a storing of the data entity in the storage system if (a) the entry is not empty and (b) the received data entity signature equals the stored data entity signature that is stored in the entry.

17. The storage system according to claim 15 wherein K repetition of the selecting of the selected data structure results in scanning the set, starting from a first data structure.

18. The storage system according to claim 15 wherein each entry of the set only stores a stored data entity signature of a received data entity that is associated with the entry.

19. The storage system according to claim 15 wherein the target address is a physical address and wherein the processor is arranged to store the received data entity at the physical address.

20. The storage system according to claim 15 wherein the target address is a virtual address and wherein the processor is arranged to store the received data entity at the virtual address.

21. The storage system according to claim 15 wherein the processor is further arranged to receive a request to read a requested data entity that has a requested data entity signature; selecting a selected data structure out of the set; calculate an index by applying, on the requested data entity signature, a hash function that is associated with the selected data structure; determine whether there is a match between (a) a stored data entity signature that is stored in an entry that is associated with the index and belongs to the selected data structure and (b) the requested data entity signature; provide, if there is a match, a data entity that is associated with the entry; select, if there is no match, a new data structure of the set and repeating at least the stages of calculating and determining.

* * * * *